United States Patent
Nishikawa (10) Patent No.: US 11,138,815 B2
(45) Date of Patent: Oct. 5, 2021

(54) VEHICLE MANAGEMENT SYSTEM

(71) Applicant: Honda Motor Co., Ltd., Tokyo (JP)

(72) Inventor: Yuji Nishikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 23 days.

(21) Appl. No.: 16/823,027

(22) Filed: Mar. 18, 2020

(65) Prior Publication Data

US 2020/0312051 A1 Oct. 1, 2020

(30) Foreign Application Priority Data

Mar. 28, 2019 (JP) .............................. JP2019-062065

(51) Int. Cl.
*G07C 5/00* (2006.01)
*G07C 5/08* (2006.01)
*B60R 25/24* (2013.01)

(52) U.S. Cl.
CPC ............ *G07C 5/008* (2013.01); *B60R 25/241* (2013.01); *G07C 5/0841* (2013.01)

(58) Field of Classification Search
CPC ...... G07C 5/008; G07C 5/0841; B60R 25/241
USPC ...................................................... 340/425.5
See application file for complete search history.

(56) References Cited

U.S. PATENT DOCUMENTS

| 2014/0065965 | A1* | 3/2014 | Prasad | G07C 5/085 455/41.2 |
| 2017/0346878 | A1* | 11/2017 | Baker | H04L 65/605 |
| 2018/0308293 | A1* | 10/2018 | DeCia | G07C 5/0808 |
| 2019/0116044 | A1* | 4/2019 | Matsumoto | H04L 9/321 |
| 2019/0311618 | A1* | 10/2019 | Au | G07C 5/02 |
| 2020/0290536 | A1* | 9/2020 | Sasaki | G01C 21/3664 |
| 2020/0344634 | A1* | 10/2020 | Hayashida | H04W 4/80 |

FOREIGN PATENT DOCUMENTS

JP 2017093289 A 5/2017

* cited by examiner

*Primary Examiner* — Hirdepal Singh
(74) *Attorney, Agent, or Firm* — Duft & Bornsen, PC (57) ABSTRACT

A vehicle management system includes: a vehicle including a control unit and a communication control unit; and a communication terminal configured to communicate with the vehicle. The communication terminal includes: an arithmetic processing unit configured to output an activation signal for activating the control unit when the communication terminal is turned on or when an application stored in the communication terminal is started; a communication unit configured to transmit the activation signal output by the arithmetic processing unit to the communication control unit; and a notification unit configured to notify a vehicle information output from the control unit activated in response to the activation signal.

17 Claims, 7 Drawing Sheets

VEHICLE MANAGEMENT SYSTEM

CROSS-REFERENCE TO RELATED APPLICATION

This application is based upon and claims the benefit of priority from Japanese Patent Application No. 2019-062065 filed on Mar. 28, 2019, the content of which is incorporated herein by reference.

BACKGROUND OF THE INVENTION

Field of the Invention

This invention relates to a vehicle management system for managing a vehicle using a communication control unit.

Description of the Related Art

As this type of vehicle management system, there have been known systems enabling transmitting and receiving of a variety of vehicle information using a communication control unit mounted on a vehicle. This type of system is described, for example, in Japanese Unexamined Patent Application Publication No. 2017-093289 (JP2017-093289A).

To acquire, in such a vehicle management system, vehicle information that varies after the vehicle has been turned off (e.g., during sleep mode), the vehicle typically has to be turned on to update the vehicle information. However, frequently updating the vehicle information in accordance with requests from a user of the vehicle or the like would unnecessarily consume vehicle power and increase cost for communication between the vehicle and user terminals of the user.

SUMMARY OF THE INVENTION

An aspect of the present invention is a vehicle management system, including: a vehicle including a control unit and a communication control unit; and a communication terminal configured to communicate with the vehicle. The communication terminal includes: an arithmetic processing unit configured to output an activation signal for activating the control unit when the communication terminal is turned on or when an application stored in the communication terminal is started; a communication unit configured to transmit the activation signal output by the arithmetic processing unit to the communication control unit; and a notification unit configured to notify a vehicle information output from the control unit activated in response to the activation signal.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Now, an embodiment of the present invention will be described with reference to FIGS. 1 to 7. A vehicle management system according to an embodiment of the present invention can be used to provide services related to a vehicle having a communication control unit mounted thereon, for example, a service that allows the user to check vehicle information of today while being present at home. The vehicle information includes information about the vehicle itself, as well as information acquirable from sensors or the like disposed on the vehicle, such as information indicating the vehicle inside/outside temperatures.

Examples of services provided using the vehicle management system according to the present embodiment include services provided by providers of vehicle rental services, such as car sharing services, such as a service that allows a vehicle rental user to check the vehicle information of the rental day of a rental vehicle having a communication control unit mounted thereon while being present at home. Hereafter, an example will be described in which this vehicle management system is used in a vehicle rental service provided by a car sharing service provider.

Figure 1:
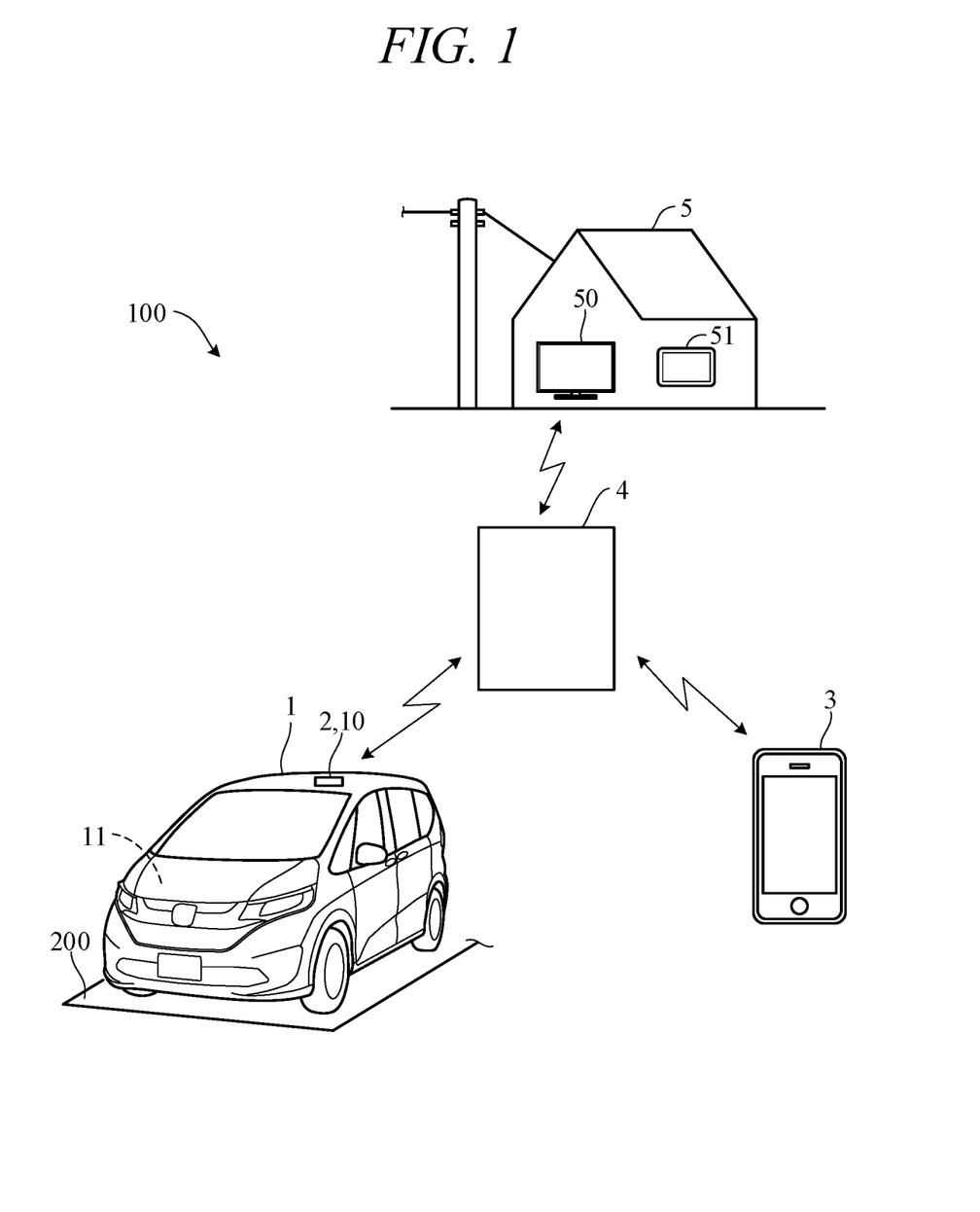
FIG. 1 is a drawing showing a schematic configuration of a vehicle management system according to an embodiment of the present invention.

FIG. 1 is a drawing showing a schematic configuration of a vehicle management system 100 according to the embodiment of the present invention. As shown in FIG. 1, in the vehicle management system 100 according to the present embodiment, a communication control unit 10 is mounted on each of vehicles (rental vehicles; only one is shown) 1 owned by a car sharing service provider and used for car sharing services. In the present embodiment, the communication control unit 10 is a telematics control unit 2 (hereafter also simply referred to as the "TCU 2"), and the TCU 2 is able to communicate with user terminals 3 (only one is shown; to be discussed later) and a server unit 4 (to be discussed later).

The vehicles 1 include different classes of four-wheel vehicles, such as sedans, wagons, minivans, SUVs, sports cars, coupes, compact cars, and light cars. Since the vehicles 1 are of various types, users of car sharing services have a large number of options, that is, user convenience is high. Note that the vehicles 1 may be of a type only for car sharing services.

A station 200 used for car sharing services is the location in which the vehicles 1 used for car sharing services are rented and returned and is a location away from the home 5 of a user of a car sharing service. To use a vehicle 1, the user rents and returns the vehicle 1 at the same station 200.

This car sharing service user is a person who has previously registered required information with the car sharing service provider. The user acquires vehicle information using his or her own user terminal 3. The user terminal 3 is able to communicate with the TCU 2 and server unit 4. Note that the vehicle management system 100 may be configured such that the user acquires vehicle information using a dedicated car sharing service terminal.

In addition to the user terminal 3, the communication terminal used by the user to acquire vehicle information may include, for example, a display or speaker-equipped device, such as a television 50, a display or speaker-equipped home appliance, or a display-equipped smart speaker 51, disposed in the home 5 and connected to a communication network, such as a wireless communication network, the Internet network, or a telephone line network. That is, the communication terminal may include a device connected to a home network and including a notification unit.

Vehicle rental services, such as car sharing services have problems associated with the state of the vehicle 1 on the rental day, and the like. Information indicating the state of the vehicle includes information that varies with time, and this time-varying information includes information that needs to be updated to detect the state of the vehicle on that day. For example, remaining fuel amount, remaining charge amount of the battery, air pressure of the tire, and the like may vary with time and correspond to information that needs to be updated.

When the user rents the vehicle 1, the vehicle needs to have sufficient fuel amount and charge amount and a proper air pressure of the tire. If the vehicle 1 has an autonomous driving function or advanced driving assistance system, such a function or system has to be properly available. Also, if the user previously knows the temperature inside or outside the vehicle 1 parked at the station 200, he or she is able to make a preparation suitable to that temperature before going to the station 200.

If the user or service provider frequently turns on the vehicle 1 to acquire such vehicle information by frequently accessing the vehicle 1 through the TCU 2 and then a control unit 11 of the vehicle 1 (e.g., an electronic control unit of the vehicle 1; hereafter simply referred to as the "ECU 11") acquires such vehicle information, the power consumption of the vehicle 1 or the communication cost of the TCU 2 would be increased. Also, if the vehicle 1 is turned on by turning on an ignition switch and then server information is updated by gathering vehicle information using the ECU 11, it takes time until the server information is updated. Consequently, necessary information may not be acquired when necessary.

In view of the foregoing, the vehicle management system according to the present embodiment is configured as follows: when the user turns on the user terminal 3, the user terminal 3 turns on the vehicle 1 placed in a turned-off state (e.g., a sleep state) by outputting an ECU activation signal (control unit activation signal) for activating the ECU 11 and the activated ECU 11 acquires vehicle information. That is, when the user gets up in the morning and turns on the user terminal 3 (e.g., the user terminal 3 placed in a sleep state), the user terminal 3 outputs an ECU activation signal for activating the ECU 11 irrespective of the intention of the user and thus the vehicle information is updated. An ECU activation signal may also be outputted not through the user terminal 3. For example, when the user gets up in the morning and turns on the television 50 or uses the smart speaker 51 in the home 5, an ECU activation signal may be outputted so that the vehicle information is updated, irrespective of the intention of the user.

The updated vehicle information is outputted to the user terminal 3, or the television 50 or the display of the smart speaker 51 or the like in the home 5 and temporarily stored in such a device. The updated vehicle information includes vehicle information that may vary after the vehicle 1 is put into a turned-off state (e.g., a less power-consuming sleep state), such as the remaining fuel amount, the remaining charge amount of the battery, the air pressure of the tire, and the vehicle inside/outside temperatures. This allows for suppression of frequent access to the vehicle 1 for acquiring vehicle information, a reduction in the power consumption or communication cost of the vehicle 1, and efficient acquisition of information that varies after the vehicle is put into a turned-off state (a sleep state). The term "turned-off state of the vehicle 1" refers to, for example, a less power-consuming rest state.

Figure 2:
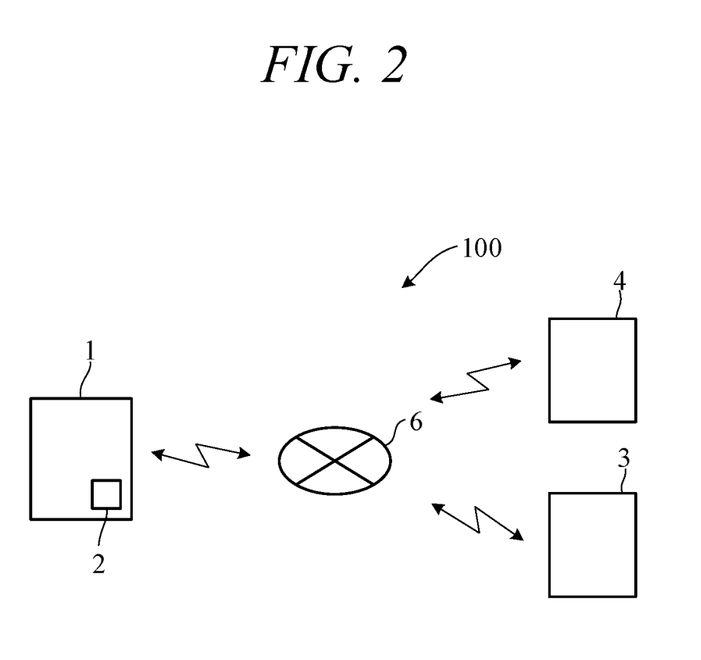
FIG. 2 is a block diagram showing a configuration of main components of the vehicle management system according to the embodiment of the present invention.

FIG. 2 is a block diagram showing the configuration of main components of the vehicle management system 100 according to the present embodiment. As shown in FIG. 2, the vehicle management system 100 includes the vehicle 1 owned by the car sharing service provider and having the TCU 2 mounted thereon, the user terminal 3 owned by the car sharing service user, and the server unit 4 disposed in the car sharing service provider.

The TCU 2, user terminal 3, and server unit 4 are connected to a communication network 6, such as a wireless communication network, the Internet network, or a telephone line network. For convenience, FIG. 2 shows one of the user terminals 3 that acquire the vehicle information of the vehicles 1. In addition to or instead of the user terminal 3, for example, the television 50, smart speaker 51, or the like in the home 5 shown in FIG. 1 may be used as a communication terminal.

Figure 3:
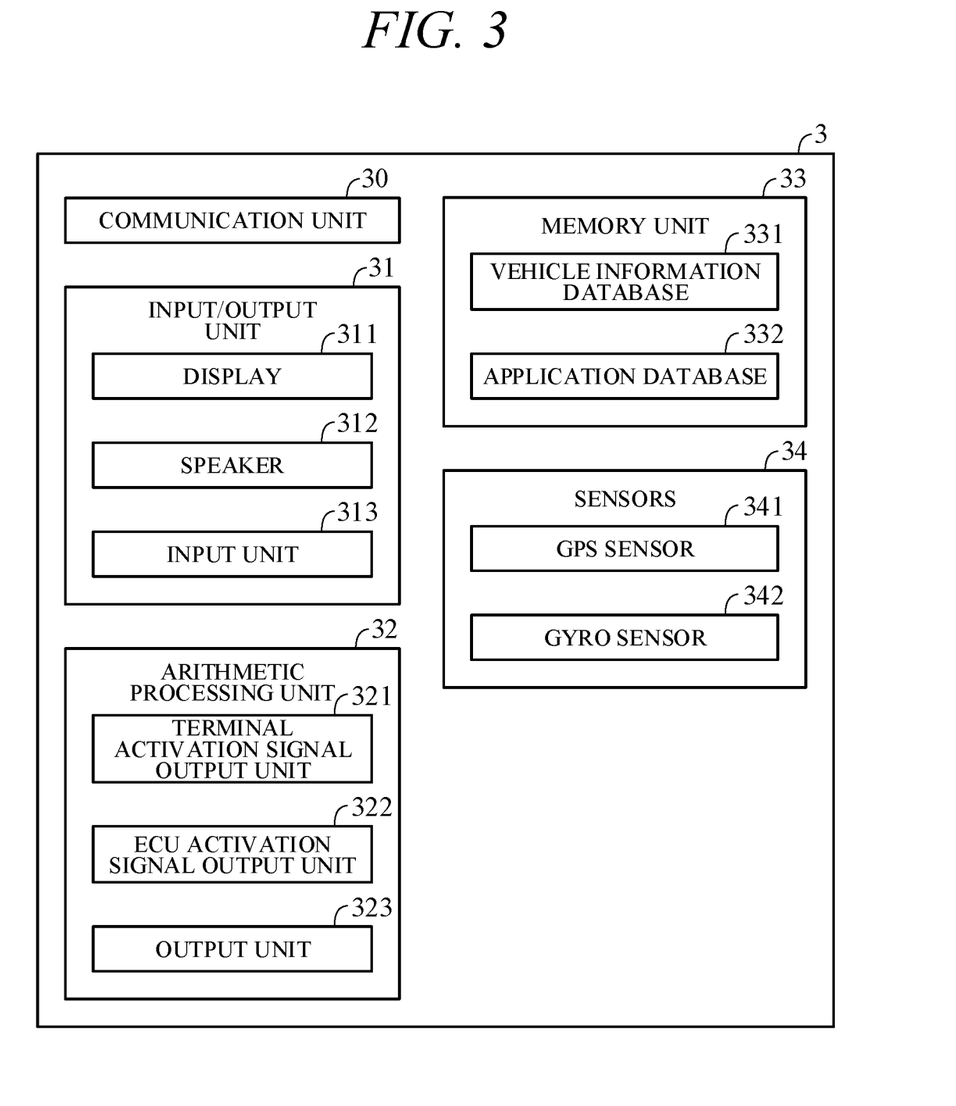
FIG. 3 is a block diagram showing a configuration of main components of a user terminal of FIG. 2.

FIG. 3 is a block diagram showing the configuration of main components of the user terminal 3. The user terminal 3 consists of a personal computer, a mobile wireless terminal, such as a smartphone, or the like operated by the user. As shown in FIG. 3, the user terminal 3 includes a communication unit 30, an input/output unit 31, an arithmetic processing unit 32, a memory unit 33, and sensors 34.

The communication unit 30 is configured to be able to wirelessly communicate with the TCU 2 of the vehicle 1 and the server unit 4 through the communication network 6. The communication unit 30 transmits a signal requesting reservation, cancelation, or the like of the vehicle 1 used for car sharing services to the server unit 4 along with a user ID identifying the user.

When the user terminal 3 is turned on, the communication unit 30 transmits an ECU activation signal for activating the ECU of the vehicle 1, to the TCU 2 through the server unit 4 or directly along with the user ID. Note that the communication unit 30 may transmit an ECU activation signal when a predetermined application stored in the memory unit 33 is started rather than when the user terminal 3 is turned on.

Examples of when the user terminal 3 is turned on include when the off-state user terminal 3 is turned on, as well as when the sleep-state user terminal 3 is put into an available state. In this case, the communication unit 30 may transmit an ECU activation signal in a predetermined time slot rather than always transmitting an ECU activation signal. For example, the communication unit 30 may transmit an ECU activation signal only when the sleep-state user terminal 3 is put into an available state in a time slot from 6:00 AM to 8:00 AM.

The input/output unit 31 includes a display 311 (notification unit), a speaker 312 (notification unit), an input unit 313, such as a keyboard or touchscreen, and the like. The user inputs user information through the input unit 313. The user information includes the address, name, contact information, and driver's license number of the user, information required for payment (e.g., the credit card number), and the like. The user is allowed to use car sharing services only after the user registers himself or herself as a member by inputting user information.

When making a reservation of the vehicle, the user inputs vehicle reservation information through the input unit 313.

For example, the user inputs the use dates/times (the use start date/time and use end date/time) of the vehicle 1. The inputted information is transmitted to the server unit 4, which then retrieves reservable vehicles 1 satisfying the use data/time conditions and transmits information about the retrieved vehicles 1 and the station 200 to the user terminal 3. The transmitted vehicle information and station information are displayed on the display 311. When the user selects a desired vehicle 1 from among the displayed vehicles 1 or accepts the displayed single vehicle 1 through the input/output unit 313, the vehicle reservation is confirmed.

Subsequently, when the user turns on the user terminal 3 or starts an application for car sharing services stored in the user terminal 3, the vehicle information of the vehicle 1 to be rented is displayed on the display 311. Note that the vehicle information may be notified from the speaker 312. The display 311 of the user terminal 3 displays an image of the vehicle 1 to be rented, as well as various types of vehicle information including vehicle information that may vary after the vehicle 1 is turned off.

Figure 4:
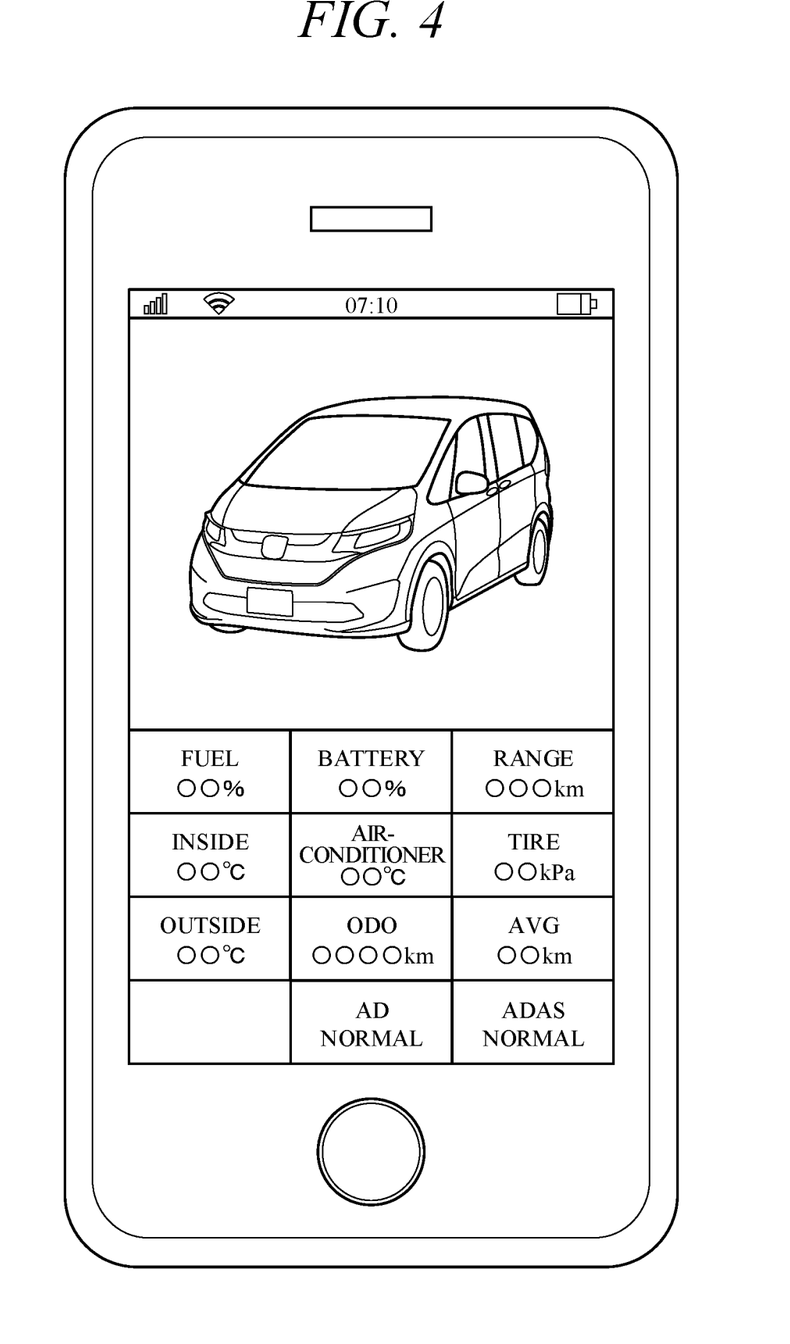
FIG. 4 is a drawing showing an example of vehicle information displayed on a display of FIG. 3.

FIG. 4 is a drawing showing an example of the vehicle information outputted to the display 311 of the user terminal 3. As shown in FIG. 4, the display 311 displays the remaining fuel amount (%), the remaining charge amount (%) of the battery, the driving range (RANGE; km), the air pressure (kPa) of the tire, the vehicle inside temperature (° C.), the vehicle outside temperature (° C.), the air-conditioner setting temperature (° C.), the odometer (ODO; km), the average fuel efficiency (AVG; km), the state of the autonomous driving (AD) function, the state of the advanced driving assistance system (ADAS), and the like.

The vehicle information displayed on the display 311 is not limited to that described above, and various types of vehicle information acquired by the ECU of the vehicle 1 can be displayed as necessary. The user may change the setting of the display form of these types of vehicle information displayed on the display 311 through the input unit 313. For example, instead of some types of vehicle information (e.g., the driving range, average fuel efficiency, or the like shown in FIG. 4), a map indicating the location of the station 200, the weather in and around the station 200, or the like may be displayed. Since the vehicle information displayed on the display 311 can be changed in accordance with the user preferences, the user convenience of the vehicle management system 100 is high.

The arithmetic processing unit 32 in FIG. 3 includes a CPU. The arithmetic processing unit 32 performs predetermined processing on the basis of signals inputted through the input/output unit 31, signals received from outside the user terminal 3 (e.g., the TCU 2 or server unit 4) through the communication unit 30, and programs, data, and the like stored in the memory unit 33 and outputs control signals to the communication unit 30, input/output unit 31, and memory unit 33. Thus, the user is able to perform change, confirmation, or the like of the reservation of the vehicle 1 through the input/output unit 31 (the display, etc.).

The arithmetic processing unit 32 includes a terminal activation signal output unit 321, an ECU activation signal output unit 322, and an output unit 323 as function elements. When an operation for turning on the user terminal 3 is detected or when start of a predetermined application is detected, the terminal activation signal output unit 321 outputs a signal for activating the user terminal 3 (a terminal activation signal). The ECU activation signal output unit 322 receives the terminal activation signal outputted from the terminal activation signal output unit 321 and outputs a signal for activating the ECU 11 of the vehicle 1 to be rented to the user (an ECU activation signal).

At this time, the ECU activation signal output unit 322 outputs an ECU activation signal to an ECU 11 previously selected from among multiple ECUs 11 of the vehicle 1. More specifically, the ECU activation signal output unit 322 outputs an ECU activation signal for activating an ECU 11 selected from among a battery ECU 111, a fuel ECU 112, a tire air pressure ECU 113, an air-conditioner ECU 114, a meter ECU 115, an advanced driving assistance system (ADAS) ECU 116, and an autonomous driving (AD) ECU 117 shown in FIG. 6.

The display 311 of the input/output unit 31 displays vehicle information acquired by the selected ECU 11. That is, the ECU activation signal output unit 322 selects an ECU 11 capable of acquiring desired vehicle information, from among the ECUs 11 and outputs an ECU activation signal to the selected ECU 11.

This allows for efficiently acquiring the desired vehicle information. For example, if the desired vehicle information is vehicle information that varies after the vehicle is put into a turned-off state (a sleep state) (first vehicle information), the vehicle information can be acquired by outputting the ECU activation signal from the ECU activation signal output unit 322 to the selected ECU 11. On the other hand, if the desired vehicle information is vehicle information that does not need to be directly acquired from the vehicle 1 (second vehicle information), the vehicle information can be acquired from vehicle information stored in the server unit 4 (a vehicle database 431 (to be discussed later)). This allows for efficiently acquiring the vehicle information. Note that the first vehicle information (the remaining fuel amount, the remaining charge amount of the battery, the vehicle inside temperature, and the like) is vehicle information that has to be updated when turning on the vehicle 1, and the second vehicle information is vehicle information that does not have to be updated. The second vehicle information may be previously stored in the server unit 4.

The output unit 323 outputs the ECU activation signal outputted by the ECU activation signal output unit 322 to the server unit 4 through the communication unit 30. Note that the output unit 323 may output the ECU activation signal to the TCU 2.

The memory unit 33 includes a volatile memory or non-volatile memory (not shown). The memory unit 33 stores various types of programs executed by the arithmetic processing unit 32 and various types of data. The memory unit 33 includes a vehicle information database 331 and an application database 332 as functional elements.

The vehicle information database 331 stores vehicle information transmitted through the communication unit 30. The application database 332 stores programs for executing applications installed by the user or preinstalled.

The sensors 34 includes various types of sensors that detect the location or state of the user terminal 3, such as a GPS sensor 341 that detects the location of the user terminal 3 by receiving signals from a GPS satellite and a gyro sensor 342 that detects the posture of the user terminal 3. Although not shown, the sensors 34 also include a battery capacity sensor that detects the remaining battery capacity of the user terminal 3, a radio-wave receiving sensor that detects the radio-wave reception situation, and the like. For example, the server unit 4 acquires location information of the user by receiving information detected by the GPS sensor 341. The server unit 4 also acquires posture information of the user terminal 3 by receiving information detected by the gyro sensor 342.

Figure 5:
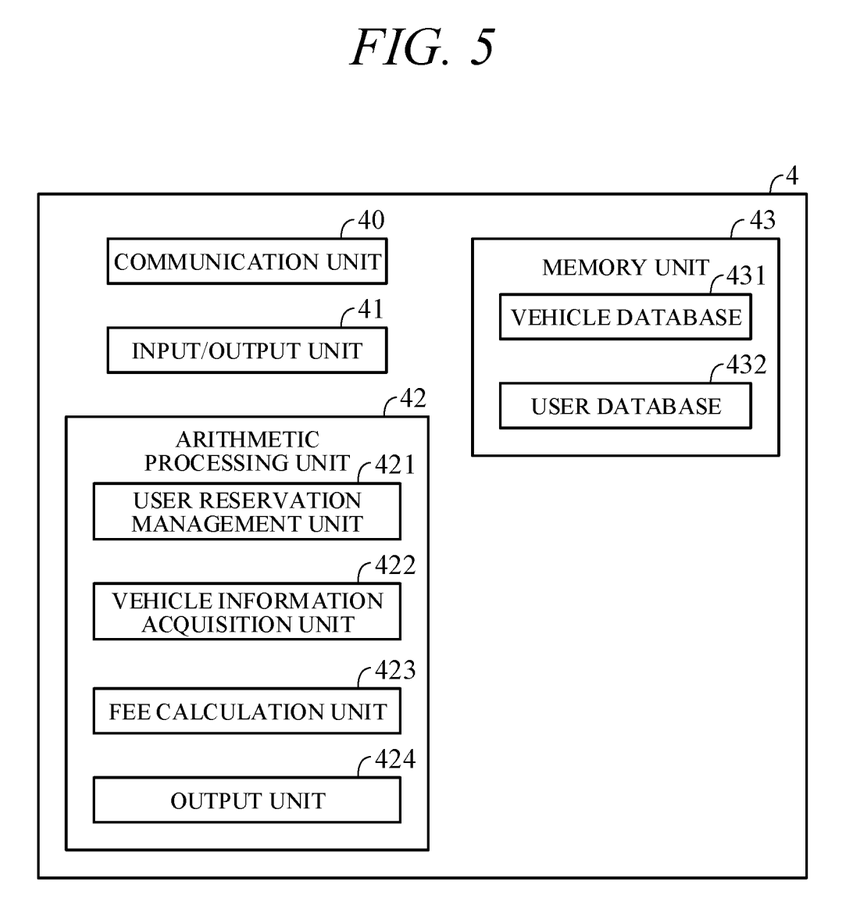
FIG. 5 is a block diagram showing a configuration of main components of a server unit of FIG. 2.

FIG. 5 is a block diagram showing the configuration of main components of the server unit 4 in FIG. 2. The server unit 4 is disposed in, for example, the car sharing service provider. The server unit 4 may be formed using virtual server functions on cloud computing. As shown in FIG. 5, the server unit 4 includes a communication unit 40, an input/output unit 41, an arithmetic processing unit 42, and a memory unit 43.

The communication unit (server communication unit) 40 is configured to be able to wirelessly communicate with the user terminal 3 and the TCU 2 of the vehicle 1 through the communication network 6. For example, the communication unit 40 transmits an ECU activation signal to the TCU 2 of the vehicle 1.

The input/output unit 41 includes, for example, a keyboard, a mouse, a display, a touchscreen, and the like and serves as an input/output interface.

The arithmetic processing unit 42 includes a CPU. The arithmetic processing unit 42 performs predetermined processing on the basis of signals inputted through the input/output unit 41, signals received from outside the server unit 4 (e.g., the user terminal 3 or the TCU 2 of the vehicle 1) through the communication unit 40, and programs and data stored in the memory unit 43 and outputs control signals to the input/output unit 41 and memory unit 43. The arithmetic processing unit 42 includes a user reservation management unit 421, a vehicle information acquisition unit 422, a fee calculation unit 423, and an output unit 424 as function elements.

The user reservation management unit 421 accepts a reservation of the vehicle 1 inputted by the user through the input/output unit 31 of the user terminal 3.

The vehicle information acquisition unit 422 acquires the vehicle information of the vehicle 1 to be rented to the user, through the TCU 2 or from a vehicle database 431.

The fee calculation unit 423 calculates the use fee of the vehicle 1 to be rented to the user.

When the communication unit 40 receives the ECU activation signal transmitted from the user terminal 3, the output unit 424 outputs an ECU activation signal corresponding to this ECU activation signal, that is, an ECU activation signal for activating the previously selected ECU 11. This ECU activation signal is transmitted to the TCU 2 through the communication unit 40, leading to activation of the previously selected ECU 11. The output unit 424 also outputs the vehicle information of the vehicle 1 acquired through the TCU 2 (the first vehicle information) and the vehicle information of the vehicle 1 acquired from the vehicle database 431 (the second vehicle information). These types of vehicle information are transmitted to the user terminal 3 through the communication unit 40. Thus, the user is able to grasp the vehicle information of the vehicle 1, that is, the previously selected vehicle information. The output unit 424 also outputs information indicating the use fee of the vehicle 1 to be rented to the user calculated by the fee calculation unit 423. The use fee information is transmitted to the user terminal 3 through the communication unit 40. Thus, the user is able to grasp the use fee of the vehicle 1.

The memory unit 43 includes a volatile memory or non-volatile memory (not shown). The memory unit 43 stores various types of programs executed by the arithmetic processing unit 42 and various types of data. The memory unit 43 includes the vehicle database 431 and a user database 432 as functional elements.

The vehicle database 431 stores vehicle IDs identifying the multiple vehicles 1 used for car sharing services and the vehicle information of the vehicles 1, including information specific to the vehicles 1, such as the vehicle types, model years, body numbers, vehicle numbers of the vehicles 1, and information indicating the states of the vehicles 1, such as the remaining fuel amount, the remaining charge amount of the battery, the air pressure of the tire, the vehicle inside temperature, and the air-conditioner setting temperature of the vehicles 1. That is, the vehicle database 431 stores the vehicle information of the vehicles such that the vehicle information corresponds to the vehicle IDs. The vehicle database 431 also stores information indicating the current and future time-series reservations, information indicating the plan of maintenance of the vehicles 1 performed between the reservations, and the like.

The user database 432 stores the user IDs identifying the users inputted through the input/output units 31 of the user terminals 3 and user information, such as the addresses, names, contact information, and driver's license numbers of the users. That is, the user database 432 stores the user information of the users such that the user information corresponds to the user IDs.

Figure 6:
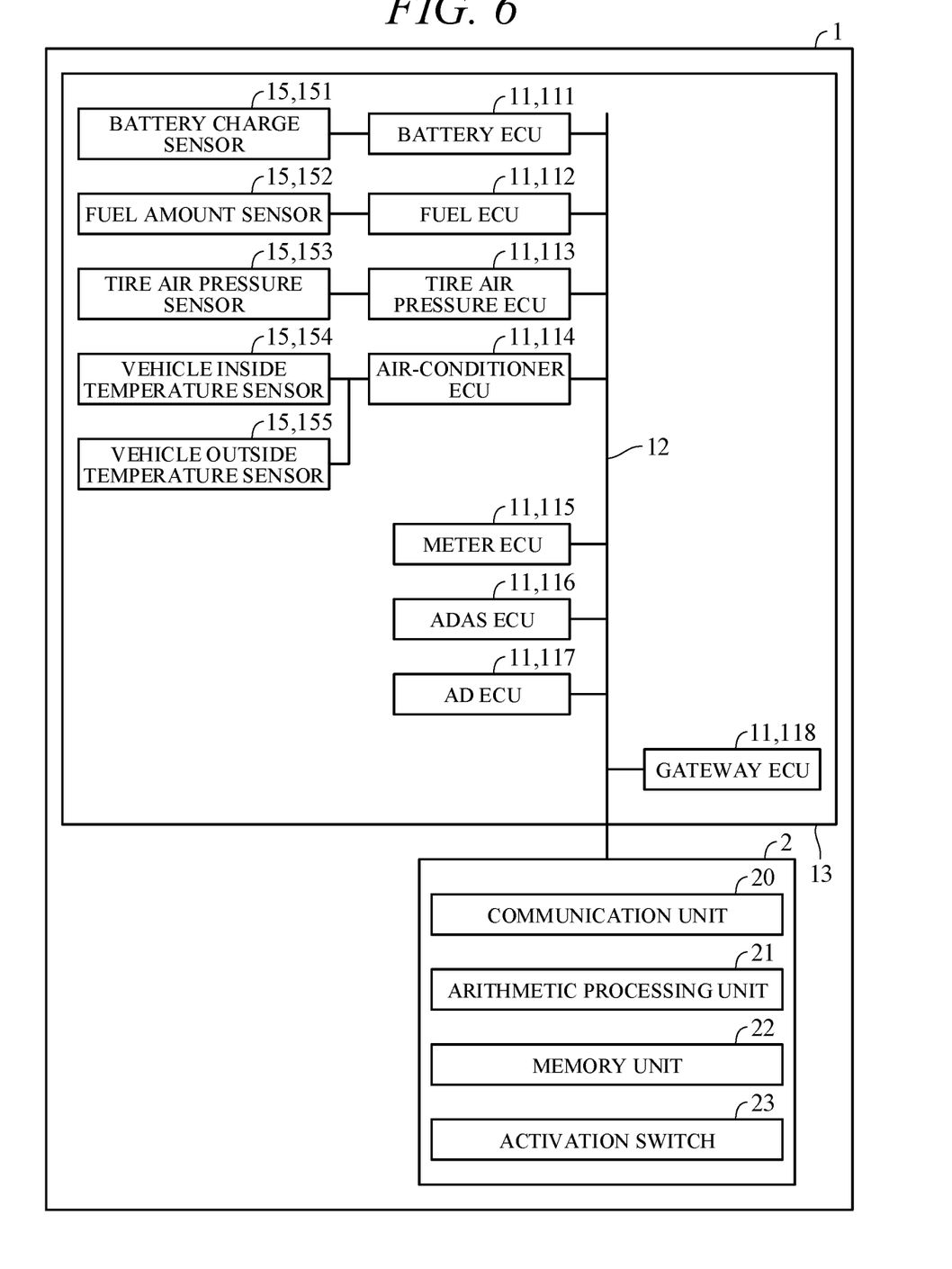
FIG. 6 is a block diagram showing a configuration of main components of a vehicle of FIG. 1.
Figure 7:
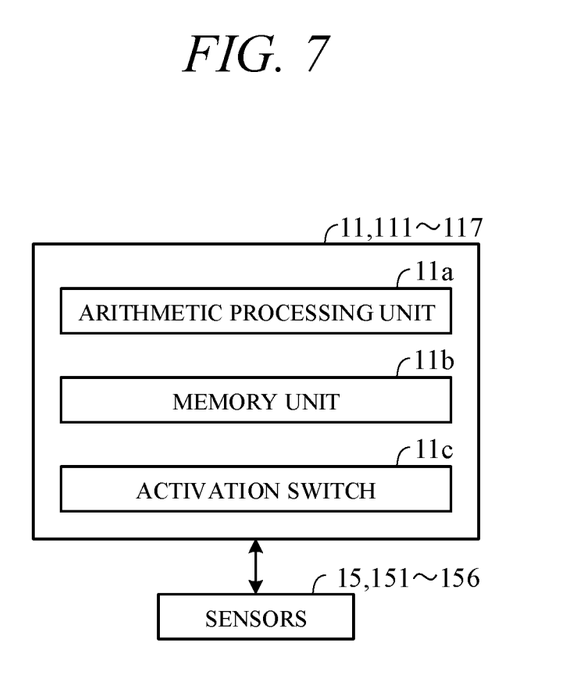
FIG. 7 is a block diagram showing a configuration of main components of an Electronic Control Unit of FIG. 6.

FIG. 6 is a block diagram showing the configuration of main components of the vehicle 1 used in the vehicle management system 100 according to the present embodiment. FIG. 7 is a block diagram showing the configuration of main components of an ECU 11. As shown in FIG. 6, the vehicle 1 includes the TCU 2 and the multiple ECUs 11.

The TCU 2 includes a communication unit 20, an arithmetic processing unit 21, a memory unit 22, and an activation switch 23. The communication unit 20 is configured to be able to wirelessly communicate with the user terminal 3 and server unit 4 through the communication network 6.

The communication unit 20 receives the ECU activation signal transmitted from the server unit 4. Note that the communication unit 20 may receive the ECU activation signal transmitted from the user terminal 3. When the ECU activation signal is inputted to the TCU 2 through the communication unit 20, power is supplied to the TCU 2 through the activation switch 23. That is, when the ECU activation signal is inputted to the TCU 2, the TCU 2 is activated. The ECU activation signal includes an electronic control unit ID (identification information) identifying an ECU 11 to be activated.

The arithmetic processing unit 21 includes a CPU. The arithmetic processing unit 21 performs predetermined processing on the basis of signals received from outside the TCU 2 through the communication unit 20 and programs and data stored in the memory unit 22 and outputs control signals to the ECUs 11 of the vehicle 1 and the memory unit 22. The arithmetic processing unit 21 also identifies an ECU to be activated on the basis of the ECU activation signal inputted through the communication unit 20 and, more specifically, on the basis of electronic control unit IDs identifying the multiple ECUs 11 included in the ECU activation signal and outputs an ECU activation signal to the identified ECU 11 through the communication bus 12.

The arithmetic processing unit 21 also controls transmission and reception of signals between the TCU 2 and server unit 4 by outputting control signals to the communication unit 20. For example, when the ECU 11 outputs vehicle information, the arithmetic processing unit 21 transmits the outputted vehicle information to the server unit 4 through the communication unit 20 along with a vehicle ID. The server unit 4 determine a user corresponding to the received vehicle ID and transmits the vehicle information to the user terminal 3 of the determined user.

The memory unit 22 stores programs, data, the electronic control unit IDs identifying the ECUs 11, and the like.

The multiple ECUs 11 are connected through the communication bus 12 and form an in-vehicle communication network 13 of the vehicle 1. The in-vehicle communication network 13 is, for example, a controller area network (CAN). Note that the in-vehicle network may be another communication standard, such as a local area interconnect network (LIN).

As shown in FIG. 7, each ECU 11 includes an arithmetic processing unit 11a, a memory unit 11b, and an activation switch 11c. The sensors 15 are connected to the ECUs 11. When the identified ECU 11 receives the ECU activation signal through the communication unit 12, power is supplied to the ECU 11 through the activation switch 11c. That is, the identified ECU 11 is activated when it receives the ECU activation signal.

The arithmetic processing unit 11a includes a CPU. The arithmetic processing unit 11a performs predetermined processing on the basis of signals inputted through the communication bus 12, signals detected by the sensors 15, and programs, data, and the like stored in the memory unit 11b. The arithmetic processing unit 11a then stores vehicle information in the memory unit 11b and transmits it to the TCU 2.

The memory unit 11b stores programs, data, control signals indicating the vehicle information outputted by the arithmetic processing unit 11a, and the like.

As shown in FIG. 6, the in-vehicle communication network 13 includes the battery ECU 111, the fuel ECU 112, the tire air pressure ECU 113, the air-conditioner ECU 114, the meter ECU 115, the advanced driving assistance system (ADAS) ECU 116, the autonomous driving (AD) ECU 117, and a gateway ECU 118.

Connected to the battery ECU 111 is a battery charge sensor 151 that detects the remaining charge amount of the battery (not shown) mounted on the vehicle 1. The battery ECU 111 stores information indicating the remaining charge amount of the battery detected by the battery charge sensor 151 in the memory unit 11b and transmits it to the TCU 2.

Connected to the fuel ECU 112 is a fuel amount sensor 152 that detects the amount of the fuel remaining in a fuel tank (not shown) of the vehicle 1. The fuel ECU 112 stores information indicating the remaining fuel amount detected by the fuel amount sensor 152 in the memory unit 11b and transmits it to the TCU 2.

Connected to the tire air pressure ECU 113 is a tire air pressure sensor 153 that detects the air pressure of the tires (not shown) of the vehicle 1. The tire air pressure ECU 113 stores information indicating the tire air pressure detected by the tire air pressure sensor 153 in the memory unit 11b and transmits it to the TCU 2.

Connected to the air-conditioner ECU 114 is a vehicle inside temperature sensor 154 that detects the inside temperature of the vehicle 1 and a vehicle outside temperature sensor 155 that detects the outside temperature of the vehicle 1. The air-conditioner ECU 114 stores information indicating the vehicle inside/outside temperatures detected by the vehicle inside temperature sensor 154 and vehicle outside temperature sensor 155 in the memory unit 11b and it to the TCU 2.

Connected to the meter ECU 115 are meters (not shown) of the vehicle 1. Examples of those meters include an odometer that detects the travel distance of the vehicle 1 and an average meter that detects the average fuel efficiency. The meter ECU 115 stores information indicating meter indications detected by the meters in the memory unit 11b and transmits it to the TCU 2.

Connected to the advanced driving assistance system (ADAS) ECU 116 is the advanced driving assistance system (not shown) of the vehicle 1. The advanced driving assistance system (ADAS) ECU 116 stores information indicating whether the advanced driving assistance system is functioning properly, in the memory unit 11b and transmits it to the TCU 2.

Connected to the autonomous driving (AD) ECU 117 is the autonomous driving (AD) system (not shown) of the vehicle 1. The autonomous driving (AD) ECU 117 stores information indicating whether the autonomous driving system is functioning properly, in the memory unit 11b and transmits it to the TCU 2.

The gateway ECU 118 connects multiple in-vehicle communication networks 13 and relays exchange of ECU signals between the multiple communication networks. For example, the gateway ECU 118 connects the in-vehicle communication networks 13 and the TCU 2 and relays exchange of various types of control signals therebetween.

The vehicle management system 100 according to the present embodiment is able to produce the following advantageous effects.

(1) The vehicle management system 100 includes the vehicles 1 each including the multiple ECUs 11 and the TCU 2 connected thereto and the user terminals 3 capable of communicating with the vehicles 1 (FIG. 2). Each user terminal 3 includes the ECU activation signal output unit 322 that outputs an ECU activation signal for activating an ECU 11 when the user terminal 3 is turned on or when an application stored in the user terminal 3 is started, the communication unit 30 that transmits the ECU activation signal outputted by the ECU activation signal output unit 322 to the TCU 2, and the input/output unit 31 (display 311, speaker 312) that notifies vehicle information outputted from the ECU 11 activated in accordance with the activation signal (FIG. 3).

This configuration allows the user terminal 3 to acquire the vehicle information in accordance with activation of the user terminal 3, or the like, irrespective of the intention of the user. Thus, this configuration allows for suppression of frequent access to the vehicle 1 for acquiring vehicle information in accordance with requests of the user, a reduction in the power consumption or communication cost of the vehicle 1, and efficient acquisition of vehicle information that varies after the vehicle is turned off (during sleep mode).

(2) The vehicle management system 100 also includes the server unit 4 including the memory unit 43 that stores vehicle information acquired by the ECUs 11 (FIGS. 2 and 5). Thus, as long as information that does not vary after the vehicle is turned off, that is, information that does not have to be updated is stored in the server unit 4, the ECUs 11 to be activated are only the ECUs 11 that acquire information which varies after the vehicle is turned off. This allows for efficiently acquiring vehicle information while suppressing power consumption.

(3) The ECU activation signal output unit 322 outputs an ECU activation signal to an ECU 11 that acquires predetermined vehicle information to be notified by the input/output unit 31 (display 311, speaker 312). This prevents useless activation of the ECUs 11 and allows for efficiently acquiring vehicle information while suppressing power consumption.

(4) Each vehicle 1 includes the multiple ECUs 11 (FIG. 6). The ECU activation signal output unit 322 identifies ECUs 11 that acquire vehicle information previously selected by the user having the user terminal 3, from among the multiple ECUs 11 and outputs ECU activation signals to the identified ECUs 11. Thus, only some of the multiple ECUs 11 are activated, allowing for efficiently acquiring vehicle information while suppressing power consumption.

(5) The input/output unit 31 includes the display 311 that displays vehicle information previously selected by the user of the user terminal 3 (FIG. 3). This allows the user to easily grasp the vehicle information.

(6) The user terminal 3 owned by the user or a device connected to the home network is used as a communication terminal capable of communicating with the vehicle 1 (FIG. 1). Thus, for example, the user is able to check the vehicle information of the vehicle 1 (e.g., a rental vehicle) while being present at home.

(7) When the TCU 2 receives an ECU activation signal, it transmits ECU activation signals to multiple ECUs 11 to activate the ECUs 11 and transmits vehicle information acquired by the activated ECUs 11 to the user terminal 3. Thus, the vehicle information is updated irrespective of the intention of the user. This allows for suppression of frequent access to the vehicle 1 for acquiring vehicle information, a reduction in the power consumption or communication cost of the vehicle 1, and efficient acquisition of information that varies after the vehicle is turned off.

While, in the above embodiment, the vehicle management system 100 includes the vehicles 1, user terminals 3, and server unit 4, a vehicle management system may be configured otherwise. The vehicle management system only has to include a vehicle and a user terminal, and the user terminal may acquire vehicle information by directly accessing a communication control unit of the vehicle.

While, in the above embodiment, the user terminal 3 transmits an ECU activation signal to the TCU 2 through the server unit 4, the user terminal 3 may directly transmit the ECU activation signal to the TCU 2.

While, in the above embodiment, the display 311 notifies vehicle information by displaying the vehicle information, a notification unit may have any configuration as long as it is configured to be able to notify vehicle information. For example, the speaker 312 of the input/output unit 31 may notify the vehicle information as a notification unit. By notifying the vehicle information through the speaker 312, for example, the user is able to acquire the vehicle information without having to see the display 311, that is, the user is able to more easily acquire the vehicle information.

The above embodiment can be combined as desired with one or more of the above modifications. The modifications can also be combined with one another.

According to the present invention, it becomes possible to efficiently acquire vehicle information including information varying after the vehicle is turned off while suppressing power consumption or communication cost of the vehicle.

Above, while the present invention has been described with reference to the preferred embodiments thereof, it will be understood, by those skilled in the art, that various changes and modifications may be made thereto without departing from the scope of the appended claims.

What is claimed is:

1. A vehicle management system, comprising:
    a vehicle including a control unit and a communication control unit; and
    a communication terminal configured to communicate with the vehicle, wherein the communication terminal includes:
        an arithmetic processing unit configured to output an activation signal for activating the control unit when the communication terminal is turned on or when an application stored in the communication terminal is started;
        a communication unit configured to transmit the activation signal output by the arithmetic processing unit to the communication control unit; and
        a notification unit configured to notify vehicle information output from the control unit activated in response to the activation signal, wherein
    the vehicle management system further comprises:
    a server unit including a memory unit configured to store the vehicle information acquired by the control unit, wherein
    the server unit further includes a server communication unit configured to communicate with each of the communication control unit and the communication terminal, wherein
    the vehicle information includes first vehicle information acquired by the control unit activated in response to the activation signal and second vehicle information stored in the memory unit before the vehicle is turned off, wherein
    the server communication unit is configured to transmit the first vehicle information and the second vehicle information to the communication terminal when receiving the first vehicle information acquired by the control unit after transmitting the activation signal to the communication control unit.

2. The vehicle management system according to claim 1, wherein
    the arithmetic processing unit is configured to output the activation signal to the control unit acquiring the vehicle information to be notified by the notification unit.

3. The vehicle management system according to claim 1, wherein
    the vehicle includes a plurality of the control unit, wherein
    the arithmetic processing unit is configured to identify the control unit acquiring the vehicle information selected by a user of the communication terminal from among the plurality of the control unit and configured to output the activation signal to the control unit identified.

4. The vehicle management system according to claim 3, wherein
    the notification unit includes a display unit configured to display the vehicle information selected by the user of the communication terminal.

5. The vehicle management system according to claim 3, wherein
    the activation signal transmitted to the communication control unit includes identification information for identifying the control unit to be activated.

6. The vehicle management system according to claim 1, wherein
    the communication terminal is a device connected to a mobile wireless terminal or a home network owned by a user of the communication terminal.

7. The vehicle management system according to claim 1, wherein
    the communication control unit is configured to transmit the activation signal to the control unit to activate the control unit when receiving the activation signal and configured to transmit the vehicle information acquired by the control unit activated to the communication terminal.

8. The vehicle management system according to claim 1, wherein
the vehicle is a rental vehicle used for a car sharing service.

9. A vehicle management system, comprising:
a vehicle including a control unit and a communication control unit; and
a communication terminal configured to communicate with the vehicle, wherein the communication terminal includes:
an arithmetic processing unit configured to output an activation signal for activating the control unit when the communication terminal is turned on or when an application stored in the communication terminal is started;
a communication unit configured to transmit the activation signal output by the arithmetic processing unit to the communication control unit; and
a notification unit configured to notify vehicle information output from the control unit activated in response to the activation signal, wherein
the vehicle includes a plurality of the control unit, wherein
the arithmetic processing unit is configured to identify the control unit acquiring the vehicle information selected by a user of the communication terminal from among the plurality of the control unit and configured to output the activation signal to the control unit identified.

10. The vehicle management system according to claim 9, further comprising:
a server unit including a memory unit configured to store the vehicle information acquired by the control unit.

11. The vehicle management system according to claim 10, wherein
the server unit further includes a server communication unit configured to communicate with each of the communication control unit and the communication terminal, wherein
the vehicle information includes first vehicle information acquired by the control unit activated in response to the activation signal and second vehicle information stored in the memory unit before the vehicle is turned off, wherein
the server communication unit is configured to transmit the first vehicle information and the second vehicle information to the communication terminal when receiving the first vehicle information acquired by the control unit after transmitting the activation signal to the communication control unit.

12. The vehicle management system according to claim 9, wherein
the arithmetic processing unit is configured to output the activation signal to the control unit acquiring the vehicle information to be notified by the notification unit.

13. The vehicle management system according to claim 9, wherein
the notification unit includes a display unit configured to display the vehicle information selected by the user of the communication terminal.

14. The vehicle management system according to claim 9, wherein
the activation signal transmitted to the communication control unit includes identification information for identifying the control unit to be activated.

15. The vehicle management system according to claim 9, wherein
the communication terminal is a device connected to a mobile wireless terminal or a home network owned by a user of the communication terminal.

16. The vehicle management system according to claim 9, wherein
the communication control unit is configured to transmit the activation signal to the control unit to activate the control unit when receiving the activation signal and configured to transmit the vehicle information acquired by the control unit activated to the communication terminal.

17. The vehicle management system according to claim 9, wherein
the vehicle is a rental vehicle used for a car sharing service.

* * * * *